(12) United States Patent
Charrier et al.

(10) Patent No.: US 8,209,111 B2
(45) Date of Patent: Jun. 26, 2012

(54) DEVICE AND METHOD FOR PROCESSING KNOCK SIGNALS OF AN INTERNAL COMBUSTION ENGINE, WITH REDUCED INFLUENCE OF INTERFERING NOISE

(75) Inventors: Eddy Charrier, Toulouse (FR); Dominique Danti, Corronsac (FR)

(73) Assignee: Continental Automotive France, Toulouse (FR)

( * ) Notice: Subject to any disclaimer, the term of this patent is extended or adjusted under 35 U.S.C. 154(b) by 517 days.

(21) Appl. No.: 12/525,933

(22) PCT Filed: Dec. 5, 2007

(86) PCT No.: PCT/EP2007/010537
§ 371 (c)(1),
(2), (4) Date: Aug. 5, 2009

(87) PCT Pub. No.: WO2008/107007
PCT Pub. Date: Sep. 12, 2008

(65) Prior Publication Data
US 2010/0106392 A1    Apr. 29, 2010

(30) Foreign Application Priority Data
Feb. 5, 2007   (FR) ..................... 07 00795

(51) Int. Cl.
*F02P 5/152*   (2006.01)
*G01L 23/22*   (2006.01)
(52) U.S. Cl. .................... 701/111; 123/406.34
(58) Field of Classification Search .................. 701/111; 123/406.34
See application file for complete search history.

(56) References Cited

U.S. PATENT DOCUMENTS

| | | | |
|---|---|---|---|
| 4,467,634 A | 8/1984 | Rohde et al. | |
| 5,144,929 A * | 9/1992 | Hosoya et al. | 123/406.21 |
| 5,400,644 A | 3/1995 | Remboski, Jr. et al. | |
| 5,739,417 A * | 4/1998 | Grob et al. | 73/35.03 |
| 6,151,954 A * | 11/2000 | Aoki et al. | 73/35.08 |
| 6,557,527 B2 * | 5/2003 | Miyaji | 123/406.36 |
| 6,736,109 B2 * | 5/2004 | Hoshino | 123/406.29 |
| 6,925,987 B2 * | 8/2005 | Mashiki | 123/406.36 |
| 2007/0000306 A1 | 1/2007 | Danet et al. | |

FOREIGN PATENT DOCUMENTS

| | | |
|---|---|---|
| DE | 39 11 554 | 10/1990 |
| EP | 0 361 057 | 4/1990 |
| EP | 0 421 952 | 4/1991 |
| FR | 2 854 693 | 11/2004 |
| JP | 56-140233 | 11/1981 |

OTHER PUBLICATIONS

International Search Report dated Apr. 21, 2008, from corresponding PCT application.

* cited by examiner

*Primary Examiner* — Erick Solis
(74) *Attorney, Agent, or Firm* — Young & Thompson

(57) ABSTRACT

A device dedicated to processing analog knock signals delivered by a sensor of an internal combustion engine coupled to an engine monitoring unit, includes processing elements for converting values of the analog signals acquired by the sensor at known instants into representative digital samples, then for temporarily storing the samples whose acquisition instants are contained in a chosen time window, and for applying chosen digital processing operations to these stored samples so as to deliver a digital output signal representative of the knock of the engine during this time window. The processing elements are responsible i) for applying a chosen digital pre-processing operation to the stored samples whose acquisition instants coincide with instants of occurrence, and ii) for adapting at least one of the digital processing operations according to the number of stored samples that are the subjects of a coincidence.

14 Claims, 2 Drawing Sheets

Figure 1:
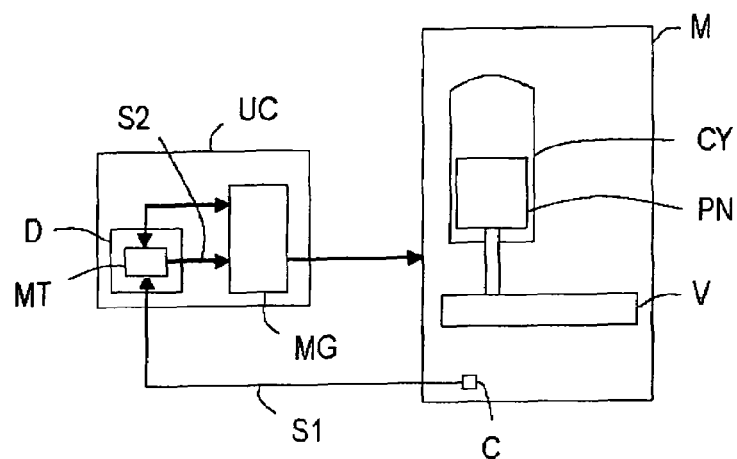

DEVICE AND METHOD FOR PROCESSING KNOCK SIGNALS OF AN INTERNAL COMBUSTION ENGINE, WITH REDUCED INFLUENCE OF INTERFERING NOISE

The invention relates to the monitoring of the operation of an internal combustion engine, and more specifically the process of obtaining the digital signals that represent the knock of such an engine and that are used to monitor its operation.

As is known to those skilled in the art, the operation of certain internal combustion engines is monitored by an engine monitoring unit (or engine control unit, ECU). This monitoring is performed based on instructions and/or setpoints and parameters representative of the current operation of the engine, and notably of its knock.

The parameter representative of the knock of the engine takes the form of a digital signal resulting from the processing, by a processing device that is generally part of the engine monitoring unit, of analog signals (generally voltages) delivered by the knock sensor (coupled to the engine).

Such a processing device more specifically comprises processing means responsible for converting the values taken by the analog signals acquired by the sensor at known instants into digital samples, then temporarily storing (in a buffer memory) the samples whose acquisition instants are contained in a chosen time window, and finally for applying chosen digital processing operations to the samples that have been stored in order to deliver a digital output signal representative of the knock of the engine during this time window. The digital processing operation generally (and in a non-limiting way) consists in filtering, rectifying and integrating (using a chosen time constant) the stored samples.

This type of processing device is, for example, described in FR 2 854 693, the technical descriptive content of which is incorporated herein by reference.

Since the sensor is installed in an environment where numerous events that generate interfering noise occur, such as, for example, the actuation of a control valve or a relief valve or even of an injector, the analog signals that it acquires are therefore interfered with by this noise. The digital output signal (generally representing an energy) is therefore "corrupted". More specifically, its level is generally higher than it should be, which can, in certain cases, provoke the erroneous detection of a knock event on the engine monitoring unit.

In an attempt to remedy this drawback, at least two solutions have been proposed. The first solution consists in adapting the filtering frequencies of the stored samples so as to reject the noise without deleting the information likely to signal a knock event. The second solution (which can be combined with the first) consists in shifting the chosen analysis time window so as to isolate the noise samples. However, if the noise and the knock events exhibit similar spectral signatures and/or if the noise does not occur at instants of occurrence situated at one of the two ends of the chosen analysis time window, it may not be rejected.

Since there is no known solution that is entirely satisfactory, the aim of the invention is to improve the situation.

To this end, it proposes a device, dedicated to the processing of analog knock signals delivered by a sensor of an internal combustion engine coupled to an engine monitoring unit, and comprising processing means responsible for converting values of the analog signals acquired by the sensor at known instants into representative digital samples, then for temporarily storing the samples whose acquisition instants are contained in a chosen time window, and for applying chosen digital processing operations to the stored samples in order to deliver a digital output signal representative of the knock of the engine during this time window.

This device is characterized by the fact that its processing means are responsible:
i) for applying a chosen digital preprocessing operation to the stored samples whose acquisition instants coincide with the instants of occurrence, known to the engine monitoring unit, of events occurring in the engine which generate a noise that interferes with the analog signals, in order to reduce the respective contributions of these stored samples (that are the subjects of a coincidence) to the digital output signal, and
ii) for adapting at least one of said digital processing operations according to the number of stored samples that are the subjects of a coincidence.

The processing device according to the invention can include other characteristics that can be taken separately or in combination, and in particular:
  its processing means may be responsible for applying a digital preprocessing operation consisting in replacing the value represented by a stored sample that is the subject of a coincidence with a chosen replacement value;
  the replacement value can, for example, be chosen to be equal to zero;
  in a variant, its processing means can be responsible, on the one hand, for determining an average value from the values of a chosen number of stored samples temporally preceding each sample that is the subject of a coincidence, and on the other hand, for using, for a sample that is the subject of a coincidence, a chosen replacement value that is equal to the corresponding average value;
  its processing means may be responsible, in cases of digital processing comprising, after the application of the digital preprocessing operation, an integration using a chosen integration time constant, for adapting the integration by replacing the chosen integration time constant with an integration time constant that is modified according to the number of stored samples that are the subjects of a coincidence;
  its processing means may be responsible for modifying the chosen integration time constant according to the ratio between the total number of stored samples and the number of stored samples that are the subjects of a coincidence;
  its processing means may be responsible for modifying the chosen integration time constant by multiplying it by the ratio between the total number of stored samples and the number of stored samples that are the subjects of a coincidence.

The invention also proposes a unit for monitoring an internal combustion engine comprising a processing device of the type of that presented hereinabove.

The invention further proposes a method, dedicated to the processing of analog knock signals delivered by a sensor of an internal combustion engine coupled to an engine monitoring unit, and consisting in converting values of the analog signals acquired by the sensor at known instants into representative digital samples, then in temporarily storing the samples whose acquisition instants are contained in a chosen time window, and in applying chosen digital processing operations to the stored samples in order to deliver a digital output signal representative of the knock of the engine during this time window.

This method is characterized by the fact that:
  a chosen digital preprocessing operation is applied to the stored samples whose acquisition instants coincide with the instants of occurrence, known to the engine monitoring unit, of events occurring in the engine which generate a noise that interferes with the analog signals, in order to reduce the respective contributions of these stored samples to the digital output signal, and at least one of the digital processing operations is adapted according to the number of stored samples that are the subjects of a coincidence.

The processing method according to the invention can include other characteristics which can be taken separately or in combination, and in particular:

the digital preprocessing operation can consist in replacing the value that is represented by a stored sample that is the subject of a coincidence with a chosen replacement value;

the replacement value can, for example, be chosen to be equal to zero;

as a variant, it is possible, on the one hand, to determine an average value from the values of a chosen number of stored samples temporally preceding a sample that is the subject of a coincidence, and on the other hand, to use a chosen replacement value that is equal to the corresponding average value for a sample that is the subject of a coincidence;

in cases of digital processing comprising, after the application of the digital preprocessing operation, an integration using a chosen integration time constant, it is possible to adapt the integration by replacing the chosen integration time constant with an integration time constant that is modified according to the number of stored samples that are the subjects of a coincidence;

it is possible, for example, to modify the chosen integration time constant according to the ratio between the total number of stored samples and the number of stored samples that are the subjects of a coincidence;

it is possible, for example, to modify the chosen integration time constant by multiplying it by the ratio between the total number of stored samples and the number of stored samples that are the subjects of a coincidence.

Figure 2:
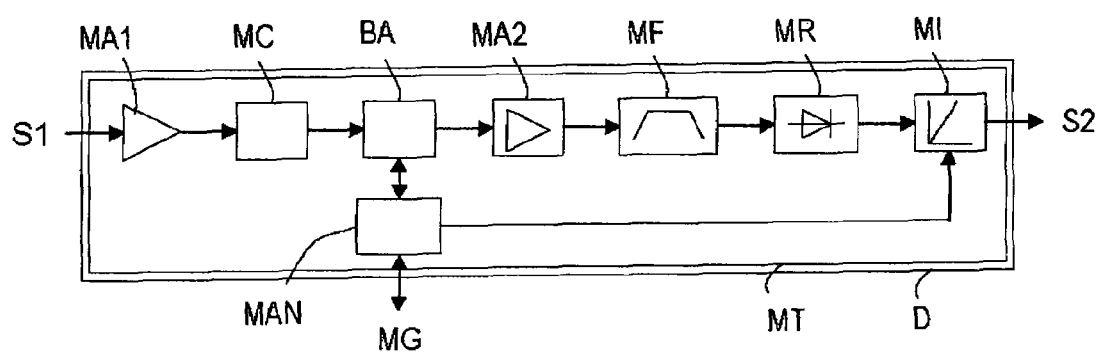
Figure 3:
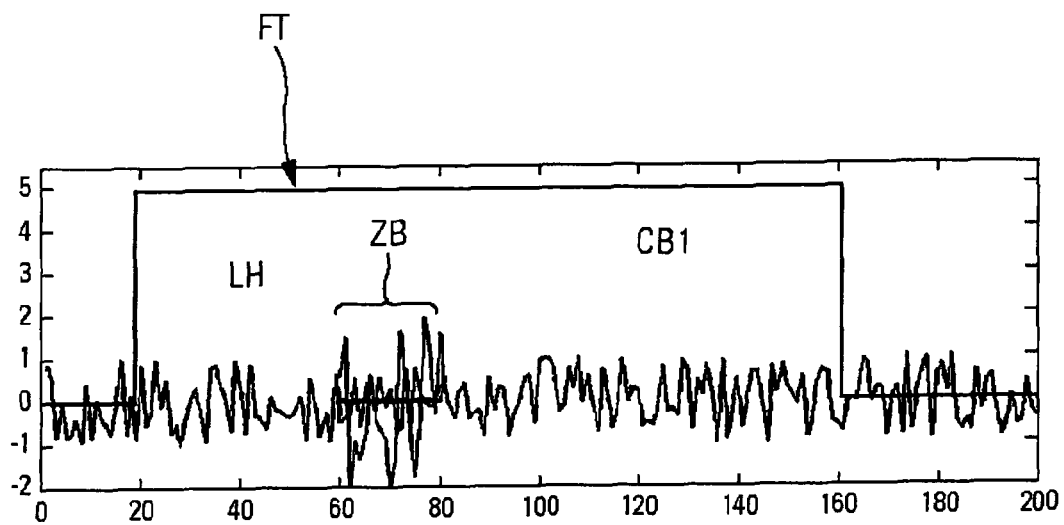
Figure 3:
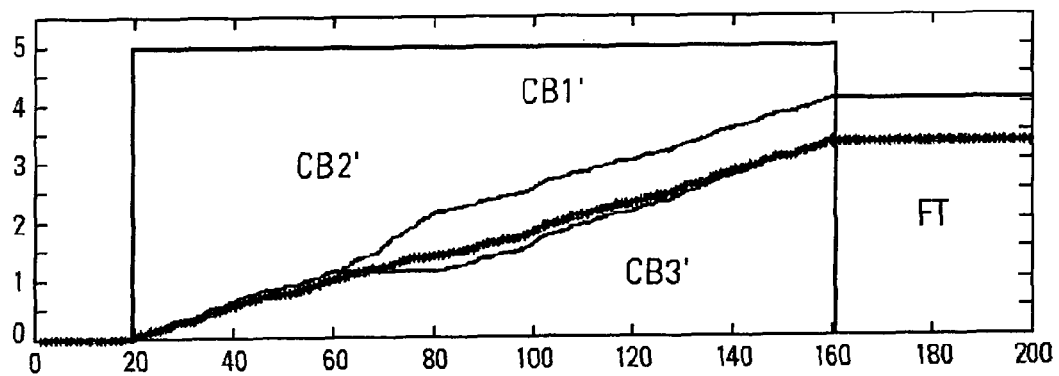

Other characteristics and advantages of the invention will become apparent from studying the detailed description hereinbelow, and the appended drawings, in which:

FIG. 1 highly schematically and functionally illustrates a portion of an engine coupled to an engine monitoring unit equipped with a processing device according to the invention, FIG. 2 highly schematically and functionally illustrates an exemplary embodiment of a processing device according to the invention, and FIG. 3 illustrates, from top to bottom, i) an exemplary time trend curve of the sampled values of the signal S1 delivered by the knock sensor within a time window, the continuous horizontal line inside the time window (extending between the instants referenced 60 and 80) representing the setting to the zero value of the noise-affected samples, and ii) three time trend curves of the digital output signal to S2 respectively in the presence of interfering noise and in the absence of a preprocessing operation according to the invention (thin-lined top curve), in the absence of interfering noise (thick-lined intermediate curve), and in the presence of interfering noise and a preprocessing operation according to the invention (thin-lined bottom curve).

The appended drawings can be used not only to complement the invention, but also to contribute to its definition, as appropriate.

The object of the invention is to provide a way of reducing the influence of certain interfering noises, generated by elements of an internal combustion engine, on a signal representative of the knock of this engine, so as to reduce the number of detections of false engine knock events.

Hereinafter, it is assumed by way of nonlimiting example that the internal combustion engine is part of a motor vehicle. However, the invention is not limited to this type of application.

As illustrated in FIG. 1, an internal combustion engine M notably comprises one or more cylinders CY, in each of which a piston PN is displaced, connected to a crankshaft V. A sensor C, installed in the engine M (generally facing a target attached to the crankshaft V), delivers analog signals S1 that are representative of the knock of the engine M. This sensor C is, for example, an accelerometer (possibly of piezoelectric type). The output of the sensor C is coupled to the input of a processing device D according to the invention.

In the nonlimiting exemplary embodiment illustrated in FIG. 1, the device D is part of an engine monitoring unit (or ECU or even onboard electronics) UC, intended to determine and deliver setting (or operating) parameter values of the engine M according to instructions and/or setpoints and parameters representative of the current operation of the engine M, and in particular its knock S2. However, in a variant, the device D could be envisaged as being external to the engine monitoring unit UC while being coupled to the latter.

As is schematically and functionally illustrated in FIG. 2, the device D essentially comprises a processing module MT. The latter is responsible for converting the analog signals S1 acquired by the sensor C at known instants into digital samples, then for temporarily storing the samples whose acquisition instants are contained in a chosen time window (or "knock window") FT, then for applying a chosen digital preprocessing operation to certain stored samples, and finally for applying chosen digital processing operations to the stored (and for some preprocessed) samples in order to deliver a digital output signal S2 representative of the knock of the engine M during this time window FT. This digital output signal S2 is addressed to a management module MG of the engine monitoring unit UC.

The digital preprocessing operation is applied to the stored samples whose acquisition instants coincide with the instants of occurrence of events which generate noise, occurring in the engine M at instants of occurrence that are known to the engine monitoring unit UC. These (engine) events include, in a non-exhaustive manner, the actuation of a control valve or of a relief valve or even of an injector. The analog signals S1 that are acquired by the sensor C are therefore interfered with by noise at known instants, and it is the preprocessing operation that is intended to limit the influence of this interfering noise on the digital output signal S2, which generally represents an energy.

More specifically, by applying the preprocessing operation to only the samples that are stored and noiseaffected (because they temporally coincide with interfering engine events), it is possible to reduce their respective contributions to the digital output signal S2. The expression "reduce" should here be understood to mean to lessen or even to eliminate.

In addition to this preprocessing operation, the processing module MT must also adapt at least one of the digital processing operations according to the number of stored and noise-affected samples (that are the subjects of a coincidence and therefore of a preprocessing operation).

We will return later and in more detail to the digital preprocessing operation and the digital processing operations applied.

As is schematically and functionally illustrated in FIG. 2, the processing module MT can be implemented in the form of analog processing modules and/or digital processing modules.

For example, the analog signals S1 can first of all be subjected to an amplification by means of an analog amplifier MA1, the gain of which may be tunable. The gain value to be used at a given instant may, for example, be determined by the engine monitoring unit UC according to the rotation speed of the engine M.

The amplified analog signals feed, one after the other, an analog/digital converter MC in order to be successively transformed into digital samples. The latter are stored one after the other in a buffer memory BA. More specifically, the digital samples that correspond to analog signals S1 whose acquisition instants (by the sensor C) are contained in a chosen time window FT are progressively stored in the buffer memory BA. An exemplary curve CB1 representing the successive sampled values of S1 in a time window FT is illustrated in the top part of FIG. 3. The area referenced ZB, and contained between the instants of the time window FT referenced 60 and 80, is an area noise-affected by engine events whose instants of occurrence are known to the engine monitoring unit UC. These events correspond, for example, to an injection of gasoline into a cylinder during its knock time window FT or during that of another cylinder. This type of event exhibits a spectral signature that is very similar to that of a knock event and is therefore located in an almost central area of a knock time window FT, and thus the noise that it generates cannot be eliminated conventionally.

The determination of the noise-affected areas ZB containing noise-affected samples is carried out by an analysis module MAN which is coupled to the management module MG of the engine monitoring unit UC. To do this, the analysis module MAN compares the acquisition instants of the analog signals S1 (that correspond in a first approximation to the storage instants of the corresponding digital samples in the buffer memory BA) to the instants of occurrence of the interfering engine events. These instants of occurrence are supplied to the analysis module MAN by the management module MG either systematically, at the initiative of the latter, or on request.

Once the analysis module MAN has identified the noise-affected samples stored in the buffer memory BA (and therefore contained in the time window FT), it can apply the digital preprocessing operation to them. The latter consists, for example, in replacing the value that is represented by a noise-affected sample (the subject of a coincidence) with a chosen replacement value.

For example, a replacement value equal to zero can be chosen.

This is notably what has been done in the example illustrated in the top part of FIG. 3. The zero-level horizontal line LH superimposed on the curve CB1 in the noise-affected area ZB represents the replacement values of the noise-affected samples.

Other replacement values can be used, and in particular non-fixed values. In practice, the analysis module MAN can, for example, be responsible for determining, for each noise-affected value, a replacement value that is equal to the average value of the values taken by a chosen number of stored samples that precede it temporally. For example, it is possible to calculate an average value from the values of two or three (or even more) prior non-noise-affected samples. When a noise-affected area is made up of a number of successive noise-affected samples, the replacement average values of the latter can, for example, all be equal to that determined for the very first noise-affected sample of this noise-affected area ZB.

Each preprocessed sample (that is, the sample whose value has been replaced) is then once again stored in the buffer memory BA in its initial place (in order to retain its initial time position).

Once the analysis module MAN has preprocessed all the noise-affected samples, it proceeds to adapt, according to the number of these noise-affected samples, at least one of the digital processing operations that are applied to the samples stored after the preprocessing phase.

This adaptation preferably relates to the integration module MI which is situated at the end of the digital processing subsystem. In the nonlimiting example illustrated in FIG. 2, the integration module MI is preceded by a digital amplification module MA2, a filtering module MF and a rectifying module (or full wave rectifier) MR.

The digital amplification module MA2 is responsible for amplifying the samples that are stored in the buffer memory BA after preprocessing, and that are contained in the time window FT concerned. The filtering module MF is responsible for filtering the amplified samples. It, for example, implements a band-pass filter in order to reject the noise without eliminating the information likely to signal a knock event. The rectifying module (or rectifier) MR is responsible for rectifying the filtered samples in order make it possible to calculate the energy.

The integration module MI is responsible for integrating all the preprocessed, amplified, filtered and rectified samples of a time window FT. For example, the integration consists in multiplying the value of the sample concerned by a chosen integration time constant (or its inverse), then adding this result to the total sum of the values of the samples that precede it.

An alternative embodiment consists in adding all the samples, then in multiplying the final sum by an integration time constant or its inverse.

The integration time constant is, for example, chosen by the engine monitoring unit UC according to certain engine parameters (for example, the speed of rotation of the engine M and/or the load of the engine M and/or the temperature of the engine M).

When the adaptation of the digital processing operations relates to the integration module MI, the analysis module MAN determines, for the time window FT concerned, after the application of the digital preprocessing operation, a modified integration time constant intended to replace the one that has been chosen (for example by the engine monitoring unit UC). This modification is made according to the number of noise-affected samples that the window concerned contains.

For example, the analysis module MAN can modify the chosen integration time constant according to the ratio between the total number of samples contained in the time window FT concerned and the number of noise-affected samples contained in this same time window FT. More specifically, the analysis module MAN can modify the chosen integration time constant by multiplying it by the ratio between the total number of samples contained in the time window FT concerned and the number of noise-affected samples contained in this same time window FT.

This modification is intended to keep the level of the output signal S2 as close as possible to the level that it would have in the absence of noise and in the absence of preprocessing.

The bottom part of FIG. 3 illustrates, by way of nonlimiting example, three time trend curves of the digital output signal S2. The first (top) curve CB1' represents the appearance of the digital output signal S2 in the presence of interfering noise and in the absence of a preprocessing operation according to the invention. The second (intermediate) curve CB2' represents the appearance of the digital output signal S2 in the absence of interfering noise. The third (bottom) curve CB3' represents the appearance of the digital output signal S2 in the presence of interfering noise and of a preprocessing operation according to the invention. As can be seen, the third curve CB3' fairly accurately follows the greater part of the second curve CB2', which means that the preprocessing operation makes it possible to reduce the respective contributions of the noise-affected samples to the digital output signal S2.

It will be noted that the processing module MT can comprise combinations of analog and/or digital processing modules that are different from that described hereinabove with reference to FIG. 2. In particular, it can present a structure of the type of that described in FR 2 854 693, complemented by the analysis module MAN and its link with the integration module MI.

The portion of the processing module MT that is dedicated to the purely digital processing (BA, MAN, MA2, MF, MR and MI) can be implemented in the form of software (or computer) modules, or a combination of circuits and software. The other portion of the processing module MT that is dedicated to the purely analog processing (MA1 and MC) can be implemented in the form of electronic circuits, or a combination of circuits and software.

It is important to note that the invention can also be considered from the angle of a processing method whose steps can, for example, be implemented by a processing device D of the type of that described hereinabove.

The invention is not limited to the embodiments of processing device, engine monitoring unit and processing method described hereinabove, purely by way of example, but it encompasses all the variants that a man skilled in the art can envisage within the framework of the claims hereinafter.

The invention claimed is:

1. A device (D) for processing analog knock signals delivered by a sensor (C) of an internal combustion engine (M) coupled to an engine monitoring unit (UC), said device (D) comprising processing means (MT) arranged to convert values of the analog signals acquired by said sensor (C) at known instants into representative digital samples, then to temporarily store the samples whose acquisition instants are contained in a chosen time window (FT), and to apply chosen digital processing operations to said stored samples so as to deliver a digital output signal representative of the knock of the engine (M) during said time window, characterized in that said processing means (MT) are arranged:
   i) to apply a chosen digital preprocessing operation to the stored samples whose acquisition instants coincide with instants of occurrence, known to the engine monitoring unit (UC), of events occurring in said engine (M) which generate a noise that interferes with said analog signals, so as to reduce the respective contributions of these stored samples to said digital output signal, and
   ii) to adapt at least one of said digital processing operations according to the number of stored samples that are the subjects of a coincidence.

2. The device as claimed in claim 1, characterized in that said processing means (MT) are arranged to apply a digital preprocessing operation consisting in replacing the value represented by a stored sample that is the subject of a coincidence with a chosen replacement value.

3. The device as claimed in claim 2, characterized in that said replacement value is chosen to be equal to zero.

4. The device as claimed in claim 2, characterized in that said processing means (MT) are arranged to determine an average value from the values of a chosen number of stored samples temporally preceding a sample that is the subject of a coincidence, and to use, for a sample that is the subject of a coincidence, a chosen replacement value that is equal to the corresponding average value.

5. The device as claimed in claim 1, characterized in that said processing means (MT) are arranged, in cases of digital processing comprising, after the application of the digital preprocessing operation, an integration using a chosen integration time constant, to adapt said integration by replacing said chosen integration time constant with an integration time constant that is modified according to the number of stored samples that are the subjects of a coincidence.

6. The device as claimed in claim 5, characterized in that said processing means (MT) are arranged to modify said chosen integration time constant according to the ratio between the total number of stored samples and the number of stored samples that are the subjects of a coincidence.

7. The device as claimed in claim 6, characterized in that said processing means (MT) are arranged to modify said chosen integration time constant by multiplying it by the ratio between the total number of stored samples and the number of stored samples that are the subjects of a coincidence.

8. A unit (UC) for monitoring an internal combustion engine (M), characterized in that it comprises a processing device (D) as claimed in claim 1.

9. A method of processing analog knock signals delivered by a sensor (C) of an internal combustion engine (M) coupled to an engine monitoring unit (UC), said method consisting in converting values of the analog signals acquired by said sensor (C) at known instants into representative digital samples, then in temporarily storing the samples whose acquisition instants are contained in a chosen time window (FT), and in applying chosen digital processing operations to said stored samples so as to deliver a digital output signal representative of the knock of the engine (M) during said time window, characterized in that:
   i) a chosen digital preprocessing operation is applied to the stored samples whose acquisition instants coincide with instants of occurrence, known to the engine monitoring unit (UC), of events occurring in said engine (M) which generate a noise that interferes with said analog signals, so as to reduce the respective contributions of these stored samples to said digital output signal, and
   ii) at least one of said digital processing operations is adapted according to the number of stored samples that are the subjects of a coincidence.

10. The method as claimed in claim 9, characterized in that said digital preprocessing operation consists in replacing the value represented by a stored sample that is the subject of a coincidence with a chosen replacement value.

11. The method as claimed in claim 10, characterized in that an average value is determined from the values of a chosen number of stored samples temporally preceding a sample that is the subject of a coincidence, and a chosen replacement value that is equal to the corresponding average value is used for a sample that is the subject of a coincidence.

12. The method as claimed in claim 9, characterized in that, in cases of digital processing comprising, after the application of the digital preprocessing operation, an integration using a chosen integration time constant, said integration is adapted by replacing said chosen integration time constant with an integration time constant that is modified according to the number of stored samples that are the subjects of a coincidence.

13. The method as claimed in claim 12, characterized in that said chosen integration time constant is modified according to the ratio between the total number of stored samples and the number of stored samples that are the subjects of a coincidence.

14. The method as claimed in claim 13, characterized in that said chosen integration time constant is modified by multiplying it by the ratio between the total number of stored samples and the number of stored samples that are the subjects of a coincidence.

\* \* \* \* \*